United States Patent
Li

(10) Patent No.: US 8,199,263 B2
(45) Date of Patent: Jun. 12, 2012

(54) METHOD OF MANUFACTURING MULTI-TOUCH LIQUID CRYSTAL DISPLAY PANEL

(75) Inventor: De-Jiun Li, Guangdong (CN)

(73) Assignee: Century Display(ShenZhen)Co.,Ltd., Longhua, Baoan, Shen-zhen, Guangdong (CN)

(*) Notice: Subject to any disclaimer, the term of this patent is extended or adjusted under 35 U.S.C. 154(b) by 188 days.

(21) Appl. No.: 12/862,791

(22) Filed: Aug. 25, 2010

(65) Prior Publication Data
US 2010/0316790 A1 Dec. 16, 2010

Related U.S. Application Data

(63) Continuation of application No. PCT/CN2009/072478, filed on Jun. 26, 2009.

(30) Foreign Application Priority Data

Oct. 8, 2008 (CN) .......................... 2008 1 0216412

(51) Int. Cl.
*G02F 1/1335* (2006.01)
(52) U.S. Cl. .................. 349/12; 349/1; 349/14; 349/56; 349/74; 349/77
(58) Field of Classification Search ................ 349/1, 12, 349/14, 56, 74, 77, 78, 80
See application file for complete search history.

(56) References Cited

U.S. PATENT DOCUMENTS

| 2007/0195029 | A1 | 8/2007 | Jeon | |
| 2010/0194710 | A1* | 8/2010 | Koito et al. | 345/174 |
| 2011/0175828 | A1* | 7/2011 | Liu et al. | 345/173 |

FOREIGN PATENT DOCUMENTS

JP 63279316 11/1988

* cited by examiner

*Primary Examiner* — Jennifer Doan
(74) *Attorney, Agent, or Firm* — Winston Hsu; Scott Margo

(57) ABSTRACT

A method of manufacturing a multi-touch LCD panel. A conductive colloidal mixture formed by mixing a plurality of conductive particles and a colloid is coated on the electrode layer of the counter substrate and is solidified to make the conductive particles electrically connect to the corresponding sensing electrodes of the array substrate. Consequently, when an external force is applied to one touching position on the counter substrate, the conductive particles electrically connect the sensing electrodes to the electrode layer and the touching signal of the position can be obtained. Due to the integration of the conductive particles into the liquid crystal cell gap, the multi-touch LCD panel has the advantages of slimness and lightness. Moreover, the manufacturing process of the conductive particles is introduced after the conventional counter substrate manufacturing method, and the objective of simple process, low cost and high yields can be achieved.

18 Claims, 7 Drawing Sheets

METHOD OF MANUFACTURING MULTI-TOUCH LIQUID CRYSTAL DISPLAY PANEL

CROSS REFERENCE TO RELATED APPLICATIONS

This application is a continuation of International Application No. PCT/CN2009/072478 filed on Jun. 26, 2009.

BACKGROUND OF THE INVENTION

1. Field of the Invention

The present invention relates to a method of manufacturing a multi-touch liquid crystal display (LCD) panel, and more particularly, to a method of manufacturing a multi-touch LCD panel that provides a touch sensing layer within a liquid crystal cell (In-Cell).

2. Description of the Prior Art

Conventional touch panels require additional touch sensing devices formed on their display panels (LCD or CRT, etc.) so as to achieve the touch sensing function. For example, a conventional resistive touch panel may sense the touch signal by attaching an indium tin oxide (ITO) panel (dual panel) onto the surface of the LCD panel. An upper panel of the ITO dual panel and a lower panel of the ITO dual panel are separated by a spacer. When a finger contacts the touch panel, the X-Y signal on the upper panel and the lower panel of the ITO dual panel will be connected and, due to the connection, the signal of position being touched is obtained. In addition, as shown in Patent JP63279316 that discloses a multi-touch panel, an ITO panel is opposite to a panel having a plurality of X patterned wires and Y patterned wires, the signal of positions are obtained by connecting the ITO panel to the cross points of the X patterned wires and the Y patterned wires.

The aforementioned manufacturing methods require attaching the touch sensing device onto the display panel, and therefore the thickness and weight of the touch panel will increase due to the attached device.

The industry is now seeking slimmer products by directly forming a touch sensing layer within the liquid crystal cell (In Cell). As shown in Publication US20070195029, a plurality of X-Y sensing wires are formed on the array substrate, and a conductive protrusion including a protrusion and an ITO electrode layer is formed on the color filter substrate. When a finger presses the color filter substrate, the conductive protrusion will electrically connect a touch sensing component X-Y on the array substrate and an intended position through pressing the color filter substrate is obtained by calculating the position's X-Y signal. Please refer to FIG. 1A. A conductive layer 230b is disposed on the surface of a touch connecting component 230 (that is, the conductive protrusion) in the liquid crystal layer. When a finger contacts the touch panel, due to an external force Po being applied on the touch panel, the touch connecting component 230 will electrically connect the touch sensing component ES1 and ES2 and the position signal is therefore obtained, as shown in FIG. 1B.

However, as disclosed in Publication US20070195029 for forming the touch connecting component 230, an extra process of making the protrusion will also be required before coating the ITO electrode layer. According to the manufacturing process of the color filter substrate 220 (in sequence of forming a black matrix, a color filter layer, an ITO electrode layer, and a liquid crystal spacer), the drawbacks of climb breaking and cracking of the ITO electrode layer are prone to occur due to the protrusion's taper angle and height.

SUMMARY OF THE INVENTION

In view of the above problems, the main objective of the present invention is to provide a method of manufacturing a multi-touch LCD panel which resolves the above problems such as climb breaking and cracking of the ITO electrode layer. By forming the touch sensing layer within the liquid crystal cell, the thickness and weight of the multi-touch LCD panel can be significantly streamlined, so as to meet the "small & light" requirements of current electrical products. Moreover, it would be relatively simple, low-cost, and capable of preventing the ITO electrode layer from experiencing the climb breaking and cracking phenomena. By introducing a process of forming the touch sensing layer after the conventional color filter manufacturing process, the aforesaid shortcomings are resolved and the product yield is improved as well.

Therefore, in order to reach the aforementioned objectives, the method of manufacturing a multi-touch LCD panel includes providing an array substrate and a counter substrate. The array substrate includes a first sensing electrode and a second sensing electrode which is adjacent and insulated from the first sensing electrode. The counter substrate includes a transparent substrate, and a black matrix, a color filter layer and an electrode layer disposed on the transparent substrate. The manufacturing method of the counter substrate is similar to that of the conventional arts; thereafter, an additional process is introduced to form the touch sensing layer. A conductive colloidal mixture, which is the result of a mixture of a plurality of conductive particles and a colloid, will be used as the touch sensing layer. The conductive colloidal mixture will be coated on the electrode layer of the counter substrate. And, thereafter, solidify the conductive colloidal mixture to make the conductive particles attach to the electrode layer and electrically connect to the electrode layer. Subsequently, place the array substrate parallel to the counter substrate in a manner that the conductive particles face the array substrate such that a liquid crystal cell gap is formed between the array substrate and the counter substrate, and the conductive particles are within the liquid crystal cell gap. Lastly, fill a liquid crystal layer into the liquid crystal cell gap and the multi-touch LCD panel in the present invention is therefore completed.

The array substrate comprises a TFT array substrate. The counter substrate comprises a color filter substrate. The electrode layer comprises, for instance, an ITO electrode layer. The material of the conductive particles is one of a metal, a resin coated with a metal on its surface, and a conductive polymer material. The shape of the conductive particles is one of a sphere, an ellipsoid or a cylinder. The colloidal of the conductive colloidal mixture is a resin or a photoresist.

The method of manufacturing a multi-touch LCD panel provided in the present invention includes forming the touch sensing layer within the liquid crystal cell instead of attaching another touch sensing device onto the display panel as shown in the conventional arts. The thickness and weight of the multi-touch LCD panel can therefore be streamlined and the "short & light" requirements of current electrical products can be satisfied. Furthermore, the present invention does not need to change the conventional color filter substrate manufacturing method, but still reaps the benefits of providing a simple and low cost manufacturing process by attaching the conductive colloidal mixture onto appropriate locations of the electrode layer while the color filter substrate is provided with the electrode layer being already formed thereon. Meanwhile, by forming the conductive particles on the electrode layer instead of forming the electrode layer on the protrusion as in the prior art, the present invention does not need to form the protrusion, so that the drawbacks of climb breaking and cracking of the ITO electrode layer will be prevented. The product yield can therefore be improved as well.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
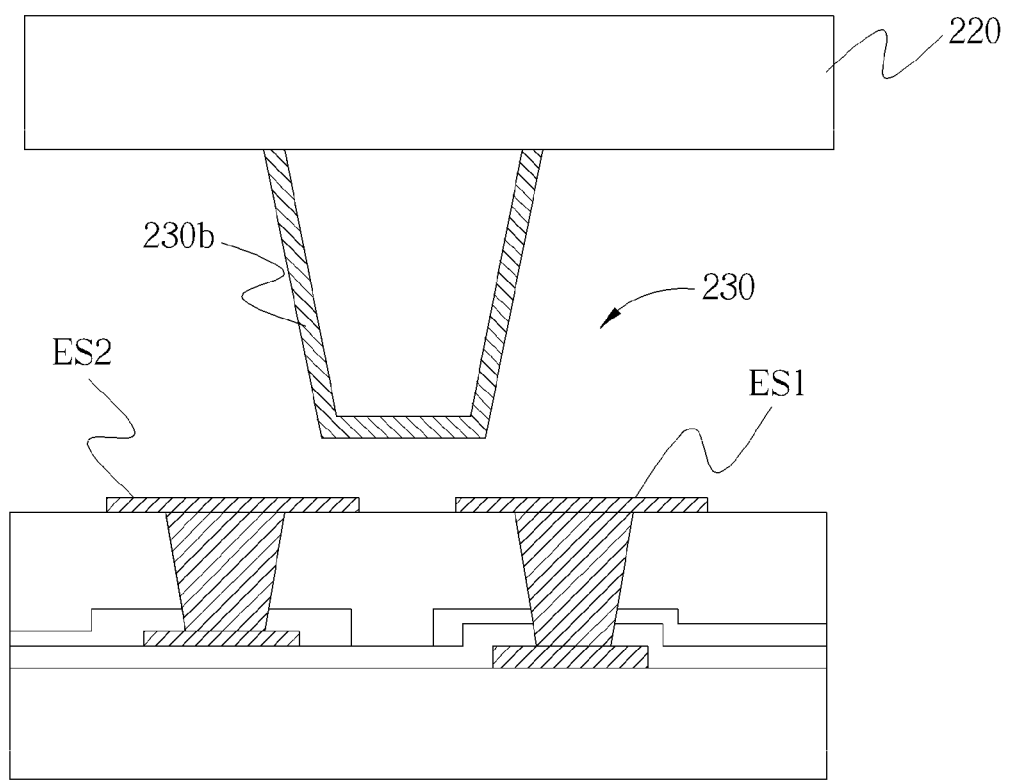
FIG. 1A is a schematic diagram of the touch sensing LCD panel in conventional arts.
Figure 1B:
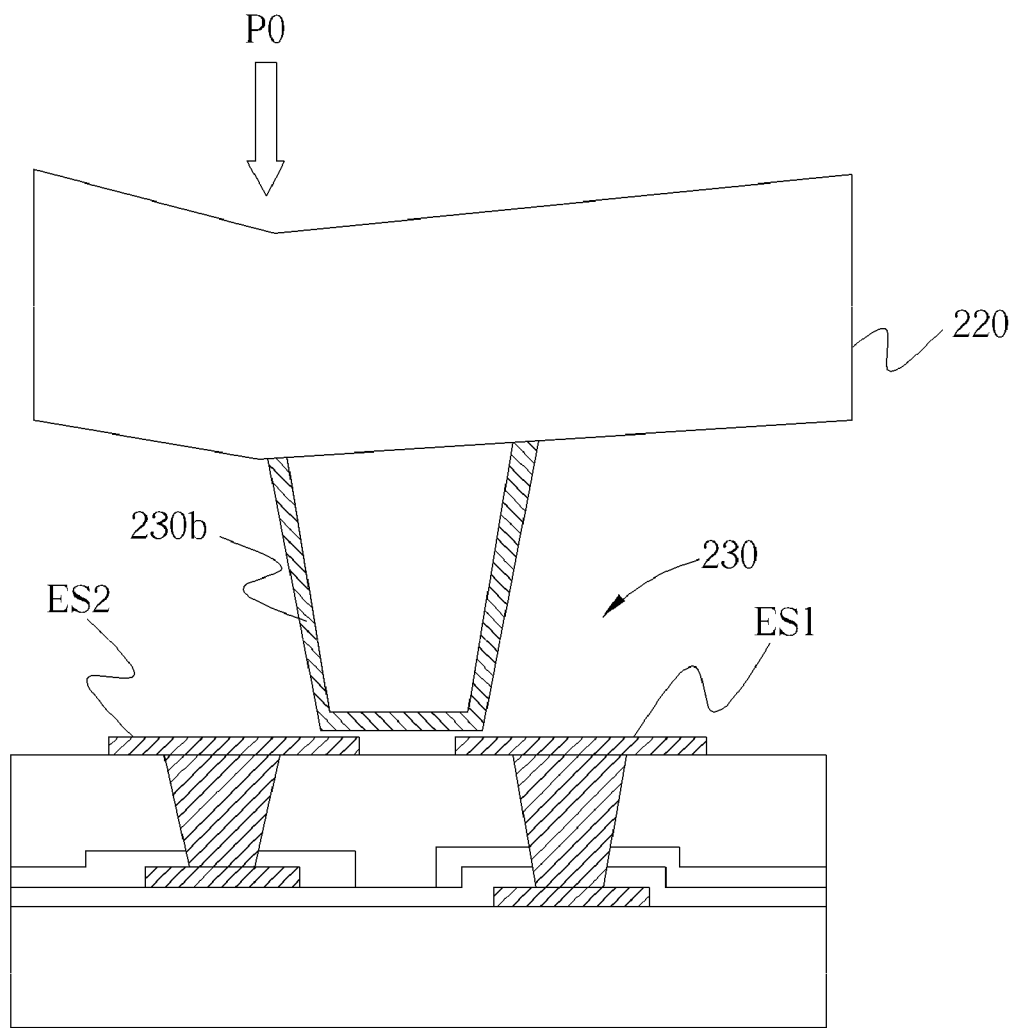
FIG. 1B shows the touching state of the touch sensing LCD panel in conventional arts.

The numerals of the FIGs. in the present invention are shown as following:
10 TFT array substrate
11 first sensing electrode
12 second sensing electrode
20 color filter substrate
21 electrode layer
30 liquid crystal layer
40 conductive particles
50 Colloid
60 liquid crystal spacer
220 color filter substrate
230 touch connecting component
230b conductive layer
ES1, ES2 touch sensing component
Po external force To provide a better understanding of the objective, the feature and the function of presented invention, detailed descriptions are shown as follows with reference to the accompanying drawings.

In order to describe the present invention with facility, the following preferred embodiment takes the manufacturing method of a TFT LCD panel as example, but should not be limited thereto in practice.

Figure 2:
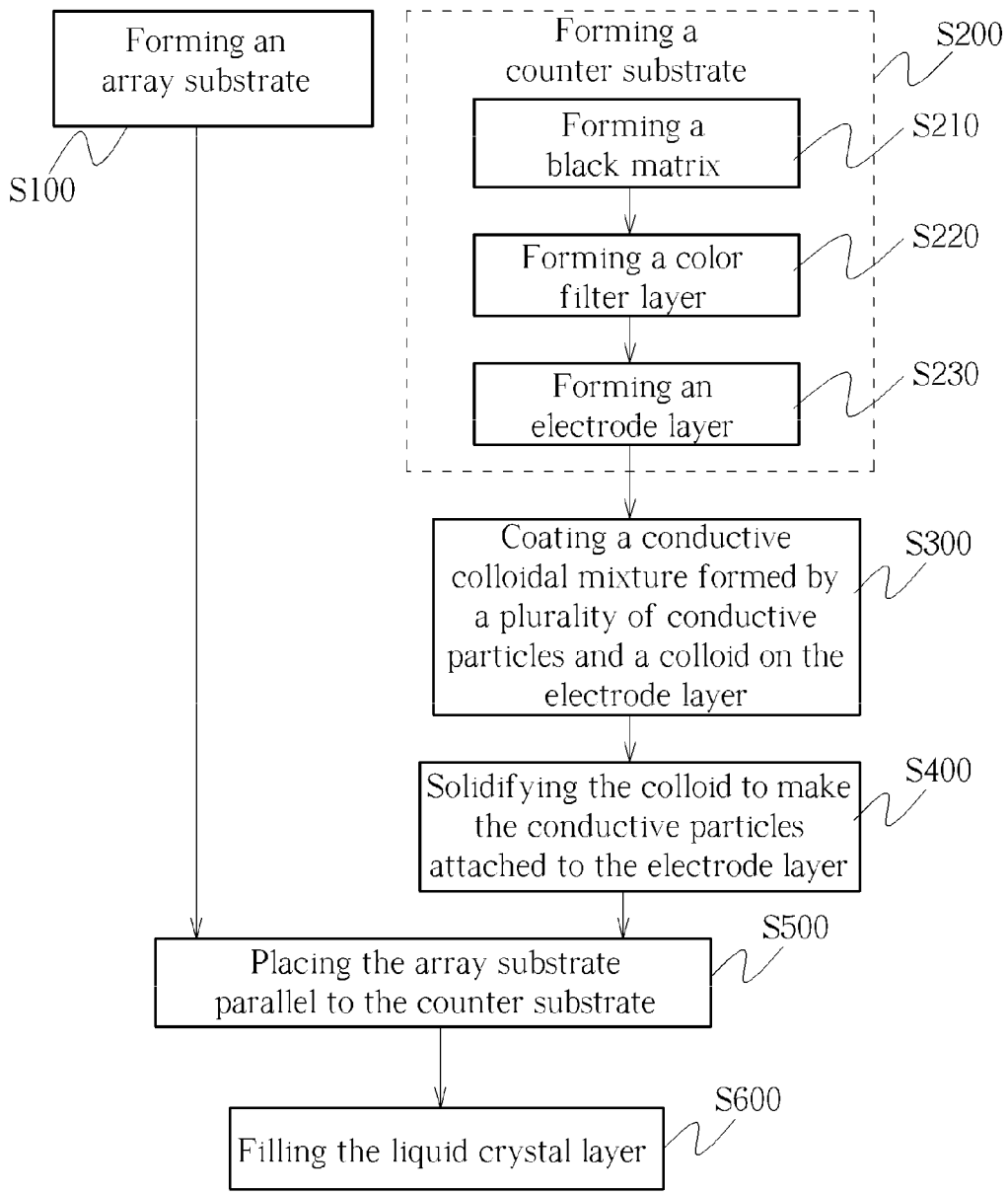
FIG. 2 shows a flow chart of one embodiment of the method of manufacturing a multi-touch LCD panel in the present invention.

Please refer to FIG. 2, illustrating a flow chart of one embodiment of the method of manufacturing a multi-touch LCD panel in the present invention. Subsequently, please also refer to FIG. 3A to FIG. 3E which describe each step of the present embodiment in detail.

Figure 3A:
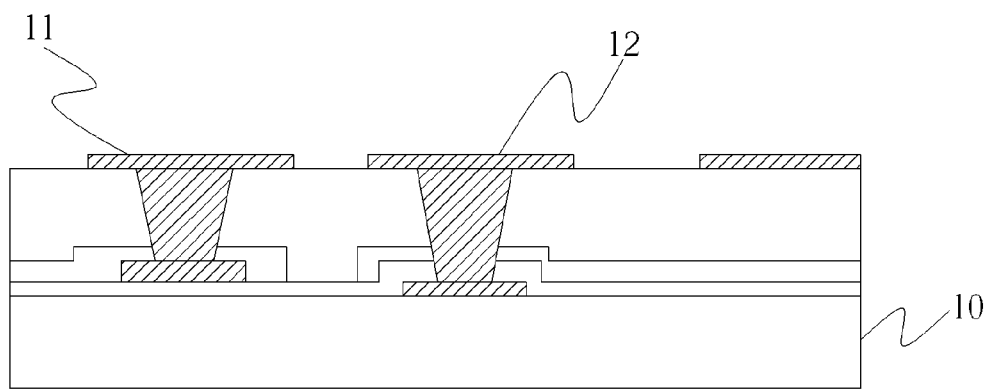
FIG. 3A to FIG. 3E are schematic diagrams showing the cross-sectional view of the method of manufacturing a multi-touch LCD panel in the present invention.
Figure 3B:
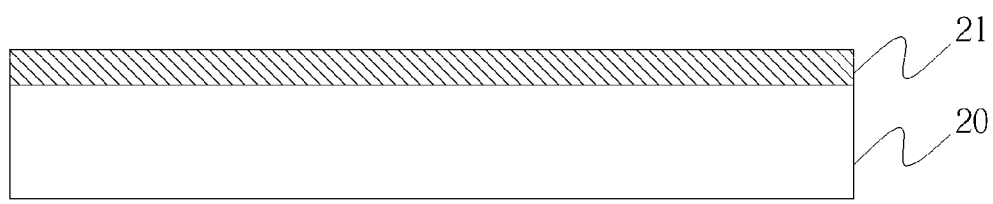

First, as shown in step S100 and step S200, the present invention provides a TFT array substrate 10 and a color filter substrate (that is, an counter substrate) 20 (please also refer to FIG. 3A and FIG. 3B, respectively). The TFT array substrate 10 includes a first sensing electrode 11 and a second sensing electrode 12 disposed thereon, and the first sensing electrode 11 and a second sensing electrode 12 which is adjacent and insulated from the first sensing electrode 11. The manufacturing process of the color filter substrate 20 is shown as in step S210-step S230. Firstly, a black matrix is formed on a color filter substrate 20, and then a color resist material is coated in the black matrix to form a color filter layer. Next, an electrode layer 21 made of transparent metal or non-transparent metal is formed on the color filter layer (To clarify the features of the present invention, FIG. 3B only shows the electrode layer 21, and the other components are omitted). The aforementioned black matrix, the color filter layer and the electrode layer 21 are formed by the conventional photoresist coating process as well as the exposure and development processes.

Subsequently, as shown in step S300, a plurality of conductive particles 40 and a colloid 50 are mixed to form a conductive colloidal mixture. Then the conductive colloidal mixture used as the touch sensing layer is coated onto the electrode layer 21 of the color filter substrate 20. The conductive particles 40 have the conductive property in order to obtain an electrical conducting function. The material of the conductive particles includes a metal, a conductive polymer material, or a resin with metal coating on its surface. The shape of the conductive particles includes a sphere, an ellipsoid or a cylinder.

Figure 3C:
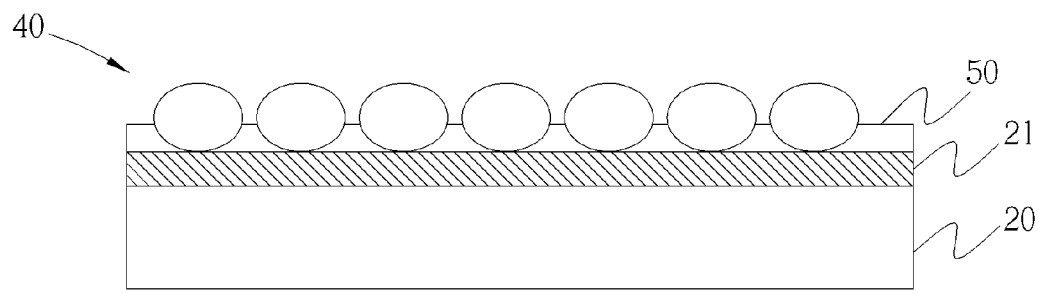
Figure 3D:
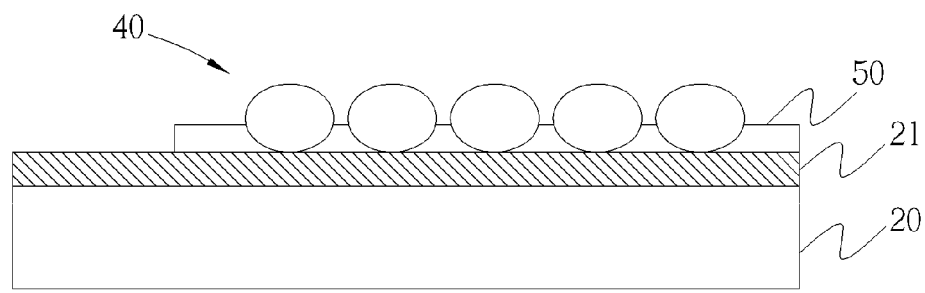
Figure 3E:
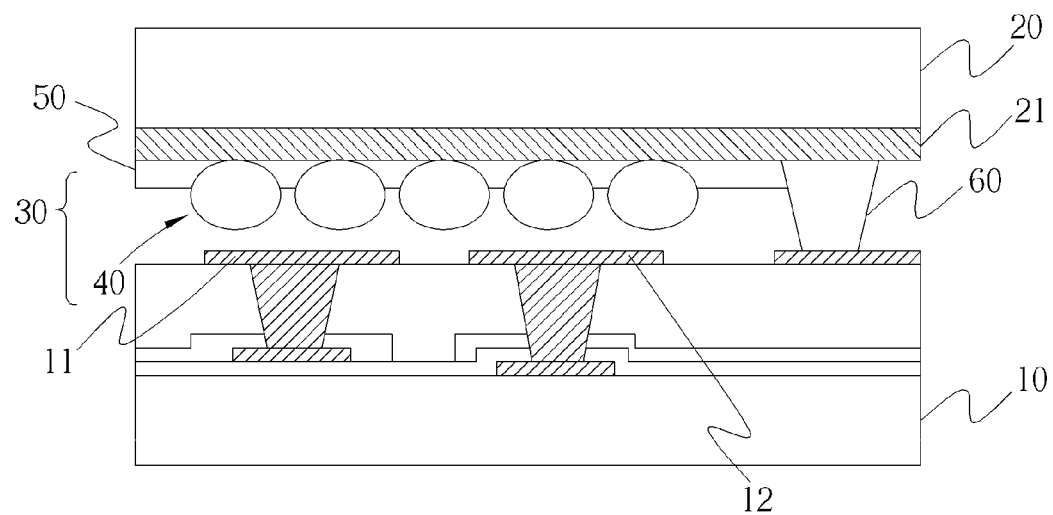

Next, as shown in step S400, the colloid 50 of the conductive colloid mixture is solidified to make the conductive particles 40 attach to the electrode layer 21 and electrically connect to the electrode layer 21 (please refer to FIG. 3C). The colloid 50 of the conductive colloid mixture includes a resin or a photoresist, and the solidifying process of the colloid 50 is executed by a thermal treatment or a radiance treatment with light energy comprehensively or locally such that the conductive particles 40 can attach onto the whole electrode layer 21 or a portion of the electrode layer 21. Taking the photoresist for example, when mixing the conductive particles 40 and the colloid 50, such as photoresist, the mixture is comprehensively coated onto the surface of the electrode layer 21, then a heating solidifying process, a mask exposing process and a developing process are performed on the aforesaid mixture, leaving the conductive colloidal mixture (the conductive particles 40 and the colloidal 50 at appropriate locations of the color filter substrate 20 (see FIG. 3D). At this point, the leaving conductive particles 40 refers to the conductive particles 40 that are located on the color filter substrate 20 and disposed corresponding to the first sensing electrode 11 and the second sensing electrode 12 of the TFT array substrate 10 after assembling the two substrates 10, 20 in the subsequent steps (which will be further described below).

Subsequently, as shown in step S500, the TFT array substrate 10 is placed parallel to the color filter substrate 20 wherein the conductive particles 40 face the array substrate 10 and correspond to the first sensing electrode 11 and the second sensing electrode 12, such that a liquid crystal cell gap is formed between the color filter substrate 20 and the TFT array substrate 10. The conductive particles 40 do not provide a supporting function for the liquid crystal cell gap. Therefore, a liquid crystal spacer 60 is provided between the TFT array substrate 10 and the color filter substrate 20 to separate the two substrates and support the liquid crystal cell gap. The height of the liquid crystal spacer 60 is greater than that of the conductive particles 40 and the liquid crystal spacer includes a columnar liquid crystal spacer. Finally, as shown in step Shoo, a liquid crystal layer 30 is filled into the liquid crystal cell gap and the manufacturing of the multi-touch LCD panel in the present embodiment is completed (please refer to FIG. 3E).

Figure 4:
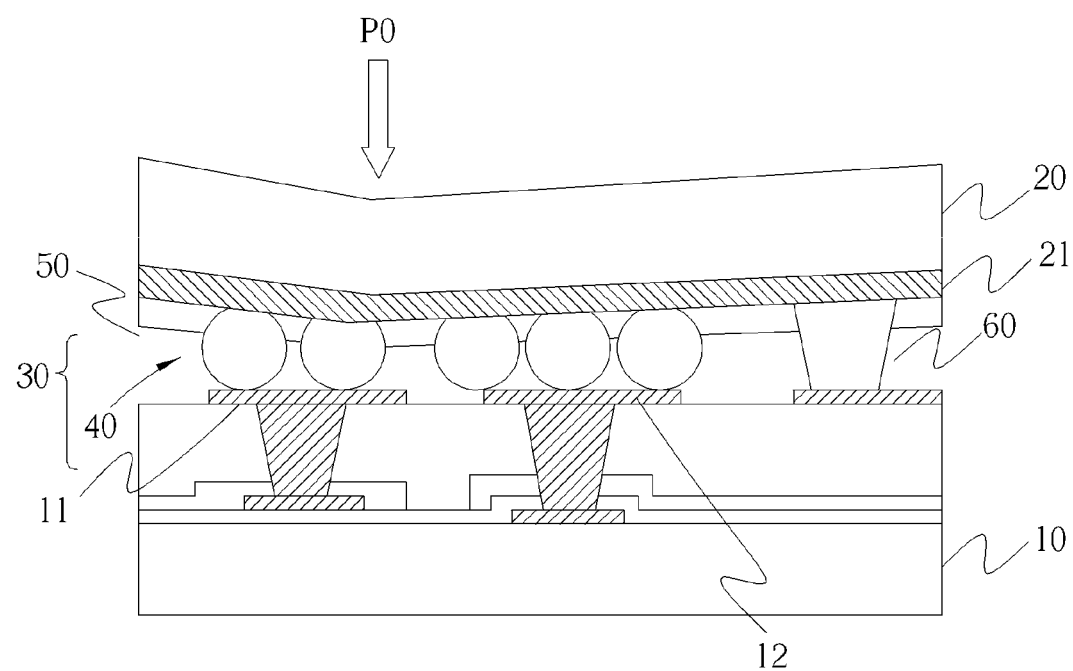
FIG. 4 shows the touching state of the multi-touch LCD panel in the present embodiment.

In addition, please refer to FIG. 4, illustrating the touching state of the multi-touch LCD panel provided by the present embodiment in the present invention.

When an external force Po is applied to a touching position on the color filter substrate 20, the conductive particles 40 in the touching position will contact the first sensing electrode 11 and the second sensing electrode 12, and the first sensing electrode 11 will be electrically connected to the second electrode 12 and the electrode layer 21 through the conductive particles 40, thus obtaining a touch signal.

Those skilled in the art will readily observe that numerous modifications and alterations of the device and method may be made while retaining the teachings of the invention.

What is claimed is:

1. A method of manufacturing a multi-touch LCD panel, comprising steps of:
   providing an array substrate and a counter substrate, wherein the array substrate comprises a first sensing electrode and a second sensing electrode which is adjacent and insulated from the first sensing electrode, and the counter substrate comprises a transparent substrate, and a black matrix, a color filter layer and an electrode layer disposed on the transparent substrate;
   coating a conductive colloidal mixture on the electrode layer, wherein the conductive colloidal mixture comprises a plurality of conductive particles and a colloid;
   solidifying the conductive colloidal mixture to make the conductive particles attach to the electrode layer and electrically connect to the electrode layer;
   placing the array substrate parallel to the counter substrate wherein the conductive particles face the array substrate and a liquid crystal cell gap is formed between the array substrate and the counter substrate; and
   filling a liquid crystal layer into the liquid crystal cell gap.

2. The method of manufacturing a multi-touch LCD panel as in claim 1, wherein the array substrate comprises a TFT array substrate.

3. The method of manufacturing a multi-touch LCD panel as in claim 1, wherein the counter substrate comprises a color filter substrate.

4. The method of manufacturing a multi-touch LCD panel as in claim 3, wherein the step of providing the color filter substrate comprises:
   forming the black matrix on the transparent substrate;
   coating a color resist material in the black matrix to form the color filter layer; and
   forming the electrode layer on the color filter layer.

5. The method of manufacturing a multi-touch LCD panel as in claim 1, wherein the step of placing the array substrate and the counter substrate further comprises forming a liquid crystal spacer disposed between the array substrate and the counter substrate to maintain the liquid crystal cell gap.

6. The method of manufacturing a multi-touch LCD panel as in claim 5, wherein a height of the liquid crystal spacer is greater than that of the conductive particles.

7. The method of manufacturing a multi-touch LCD panel as in claim 5, wherein the liquid crystal spacer comprises a columnar liquid crystal spacer.

8. The method of manufacturing a multi-touch LCD panel as in claim 1, wherein the electrode layer of the counter substrate comprises a transparent metal or a non-transparent metal.

9. The method of manufacturing a multi-touch LCD panel as in claim 1, wherein the conductive particles comprise a metal.

10. The method of manufacturing a multi-touch LCD panel as in claim 1, wherein the conductive particles comprise the particles with a shape including a sphere, an ellipsoid or a cylinder.

11. The method of manufacturing a multi-touch LCD panel as in claim 1, wherein the conductive particles comprise a resin coated with a metal on its surface.

12. The method of manufacturing a multi-touch LCD panel as in claim 1, wherein the conductive particles comprise a conductive polymer material.

13. The method of manufacturing a multi-touch LCD panel as in claim 1, wherein the colloid comprises a resin.

14. The method of manufacturing a multi-touch LCD panel as in claim 1, wherein the step of solidifying the colloid is executed by a thermal treatment or a radiance treatment with light energy.

15. The method of manufacturing a multi-touch LCD panel as in claim 14, wherein the step of solidifying the colloid is executed by a local thermal treatment or a local radiance treatment with light energy.

16. The method of manufacturing a multi-touch LCD panel as in claim 1, wherein the colloid comprises a photoresist.

17. The method of manufacturing a multi-touch LCD panel as in claim 1, wherein the conductive colloidal mixture is coated comprehensively on the electrode layer.

18. The method of manufacturing a multi-touch LCD panel as in claim 17, wherein the step of solidifying the conductive colloidal mixture comprises:
   solidifying the colloid of the conductive colloidal mixture by a thermal treatment;
   utilizing a mask to expose the colloid of the conductive colloidal mixture; and
   developing the colloid of the conductive colloidal mixture to leave the conductive colloidal mixture at the locations corresponding to the first sensing electrode and the second sensing electrode.

* * * * *